United States Patent
Lin

(10) Patent No.: US 9,755,525 B2
(45) Date of Patent: Sep. 5, 2017

(54) POWER CONVERTER CIRCUIT AND POWER LIMIT CONTROL CIRCUIT THEREOF

(71) Applicant: RICHTEK TECHNOLOGY CORPORATION, Zhubei, Hsinchu (TW)

(72) Inventor: Tzu-Chen Lin, Zhubei (TW)

(73) Assignee: RICHTEK TECHNOLOGY CORPORATION, Zhubei, Hsinchu (TW)

( * ) Notice: Subject to any disclaimer, the term of this patent is extended or adjusted under 35 U.S.C. 154(b) by 0 days.

(21) Appl. No.: 14/947,233

(22) Filed: Nov. 20, 2015

(65) Prior Publication Data

US 2016/0149497 A1    May 26, 2016

Related U.S. Application Data

(60) Provisional application No. 62/084,088, filed on Nov. 25, 2014.

(51) Int. Cl.
*H02M 3/335* (2006.01)
*H02M 1/15* (2006.01)
*H02M 7/06* (2006.01)
*H02M 1/00* (2006.01)

(52) U.S. Cl.
CPC ......... *H02M 3/33507* (2013.01); *H02M 1/15* (2013.01); *H02M 7/06* (2013.01); *H02M 2001/007* (2013.01)

(58) Field of Classification Search
CPC ......... H02M 3/33507; H02M 3/33523; H02M 3/33569; H02M 3/33592; H02M 1/15; H02M 1/32; H02M 7/06
USPC .......................................... 363/21.01–21.18
See application file for complete search history.

(56) References Cited

U.S. PATENT DOCUMENTS

| | | | | |
|---|---|---|---|---|
| 7,940,535 B2* | 5/2011 | Itoh | ..................... | H05B 41/2882 315/158 |
| 8,824,172 B2* | 9/2014 | Chen | ................. | H02M 3/33507 363/21.12 |
| 2011/0293313 A1* | 12/2011 | Samejima | ............... | H02M 1/32 399/88 |

* cited by examiner

*Primary Examiner* — Yemane Mehari
(74) *Attorney, Agent, or Firm* — Tung & Associates

(57) ABSTRACT

A power converter circuit includes a transformer for converting a primary side voltage to a secondary side voltage and generating an output current. A power limit control unit senses the secondary side voltage to obtain a waveform feature of the primary side voltage, and decides a target of the output current according to the waveform feature of the primary side voltage. When the primary side voltage drops to a threshold, the output current is reduced.

18 Claims, 9 Drawing Sheets

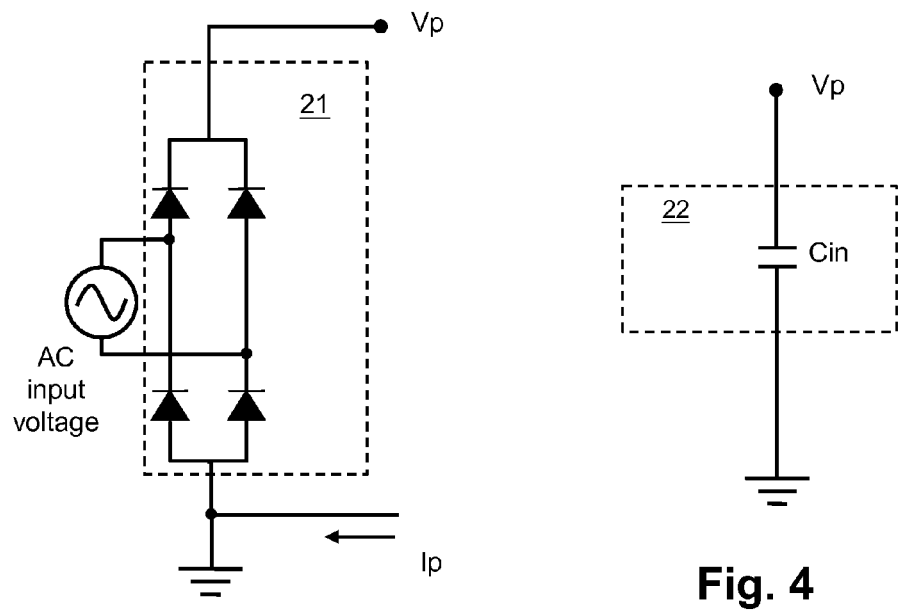
Fig. 3
Fig. 4
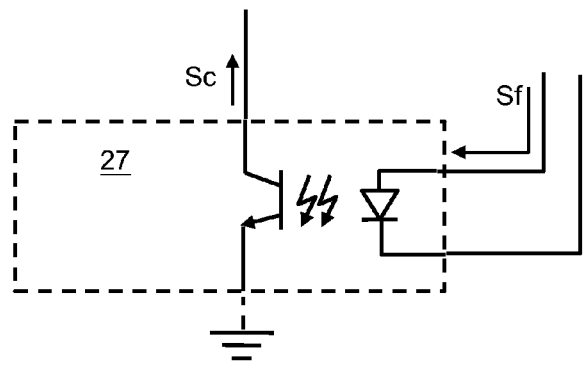
Fig. 5

POWER CONVERTER CIRCUIT AND POWER LIMIT CONTROL CIRCUIT THEREOF

CROSS REFERENCE

The present invention claims priority to U.S. 62/084,088, filed on Nov. 25, 2014.

BACKGROUND OF THE INVENTION

Field of Invention

The present invention relates to a power converter circuit for controlling an output current according to information of a primary side voltage of a transformer, wherein the information of the primary side voltage is obtained by sensing a secondary side voltage of the transformer. The present invention also relates to a power limit control circuit for use in the power converter circuit.

Description of Related Art

Please refer to FIG. 1A, an AC input voltage is rectified by a rectification circuit such as a bridge rectifier, to generate a rectified voltage. An input capacitor is connected to the output of the rectification circuit, for filtering the rectified voltage to generate a filtered voltage. A power converter circuit converts the filtered voltage to a DC output voltage. Because the AC input voltage may be unstable, which may affect the quality of the DC output voltage, the input capacitor is provided to reduce the ripple of the rectified voltage.

Referring to FIGS. 1A and 1B, the rectified voltage which is not filtered is a semi-sinusoidal wave having a lower valley, while the filtered voltage is a semi-sinusoidal wave having a higher valley, so the ripple of the filtered voltage is smoother. (The waveform of filtered voltage is not a "pure" semi-sinusoidal wave, but is still regarded as a semi-sinusoidal wave in the context of this invention. That is, any waveform that includes at least a part of a pure semi-sinusoidal waveform is regarded as a semi-sinusoidal waveform in the context of this invention.) However, in order to achieve this effect, a capacitor of a high capacitance is required for the input capacitor, which is expensive and occupies a large space. Further, when the capacitor is aged, it may not be able to provide a good ripple-filtering effect. Therefore, a flexible, space-saving and cost effective solution to reduce the ripple is desired.

SUMMARY OF THE INVENTION

In one perspective, the present invention provides a power converter circuit, which includes: a transformer, including a primary winding configured to receive a primary side voltage at a primary side of the transformer and a secondary winding configured to generate a secondary side voltage and an output current at a secondary side of the transformer, wherein the primary side voltage has a waveform that includes at least a part of a semi-sinusoidal waveform; a switch, coupled to the primary winding to determine a primary side current flowing through the primary winding; a switch control unit at the primary side of the transformer, for controlling the switch to determine the primary side current; a power limit control unit at the secondary side of the transformer, for deciding a target of the output current according to the primary side voltage, wherein the power limit control unit senses the secondary side voltage to obtain information of the primary side voltage, and sets the target of the output current according to the information of the primary side voltage such that when the primary side voltage drops to a first threshold, the output current is reduced; and a feedback unit, coupled between the power limit control unit and the switch control unit, for providing a feedback signal from the power limit control unit to the switch control unit.

In one embodiment, the primary side voltage is generated by: rectifying an AC input voltage by a rectification unit and filtering an output of the rectification unit by a ripple filter unit, wherein the ripple filter unit includes a capacitor.

In one embodiment, the power limit control unit includes: a voltage sample and hold unit, for sensing the secondary side voltage to obtain a waveform feature of the primary side voltage; a target determination unit, for determining the target of the output current according to the waveform feature of the primary side voltage; and a comparison unit, for comparing the output current and the target of the output current, to generate the feedback signal.

In one embodiment, the waveform feature is a valley of the primary side voltage or a peak of the primary side voltage.

In one embodiment, the voltage sample and hold unit includes: a secondary voltage sensing unit, for sensing the secondary side voltage to obtain sensed voltages at different timings; and a feature determination unit, for determining a highest or a lowest sensed voltage among the sensed voltages in a predetermined period, as the waveform feature of the primary side voltage.

In one embodiment, the voltage sample and hold unit further includes a debounce unit coupled to an output of the feature determination unit, for filtering a noise in the output of the feature determination unit.

In one embodiment, the feedback unit is an opto-coupler circuit.

In one embodiment, when a valley of the primary side voltage is above the first threshold, the power limit control unit sets the target of the output current to a normal operation target, and when the valley of the primary side voltage drops to the first threshold, the power limit control unit sets the target of the output current to a first reduced target which is lower than the normal operation target, and when the valley of the primary side voltage drops to a second threshold, the power limit control unit sets the target of the output current to a second reduced target which is lower than the first reduced target. In one embodiment, the second threshold is equal to the first threshold.

In one embodiment, when a peak of the primary side voltage is above the first threshold, the power limit control unit sets the target of the output current to a normal operation target, and when the peak of the primary side voltage drops to the first threshold, the power limit control unit sets the target of the output current to a first reduced target which is lower than the normal operation target, and when the peak of the primary side voltage drops to a second threshold, the power limit control unit sets the target of the output current to a second reduced target which is lower than the first reduced target.

In one embodiment, the power converter circuit further includes an inductor, coupled between the secondary winding and an output terminal connected to a load.

From another perspective, the present invention provides a power limit control circuit for use in a power converter circuit, wherein the power converter circuit includes a transformer, the transformer including a primary winding configured to receive a primary side voltage at a primary side of the transformer and a secondary winding configured to generate a secondary side voltage and an output current at a secondary side of the transformer, wherein the primary side voltage has a waveform that includes at least a part of a semi-sinusoidal waveform, the power limit control circuit being configured to be located at the secondary side of the transformer and configured to be coupled to the secondary winding, the power limit control circuit comprising: a voltage sample and hold circuit, for sensing the secondary side voltage to obtain a waveform feature of the primary side voltage; a target determination circuit, for determining a target of the output current according to the waveform feature of the primary side voltage; and a comparison circuit, for comparing the output current and the target of the output current, to generate a feedback signal which is sent to the primary side of the transformer, wherein the power limit control circuit sets the target of the output current such that when the primary side voltage drops to a first threshold, the output current is reduced.

The objectives, technical details, features, and effects of the present invention will be better understood with regard to the detailed description of the embodiments below, with reference to the drawings.

BRIEF DESCRIPTION OF THE DRAWINGS

FIG. 3 shows a rectification unit according to one embodiment of the present invention.

FIG. 4 shows a ripple filter unit according to one embodiment of the present invention.

FIG. 5 shows a feedback unit according to one embodiment of the present invention.

DESCRIPTION OF THE PREFERRED EMBODIMENTS

The drawings as referred to throughout the description of the present invention are for illustrative purpose only, to show the interrelations between the circuits and/or devices, but not drawn according to actual scale.

Figure 1A:
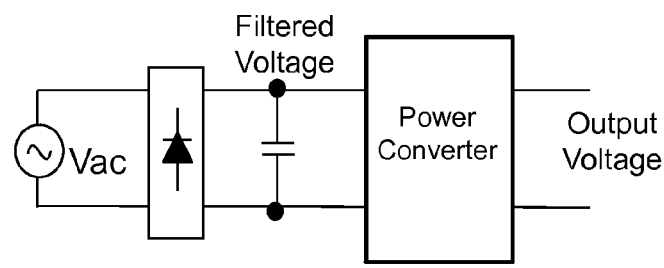
FIGS. 1A-1B show a prior art power converter and waveforms of a rectified voltage and a filtered voltage according to the prior art.
Figure 1B:
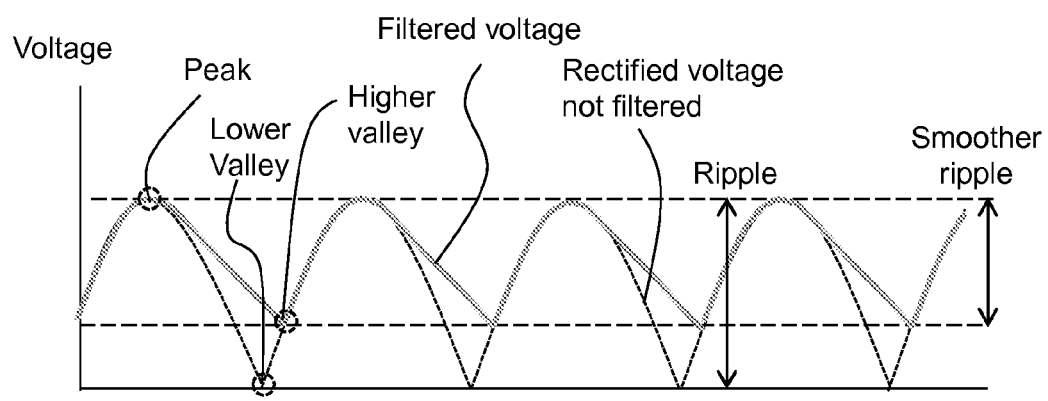
Figure 2:
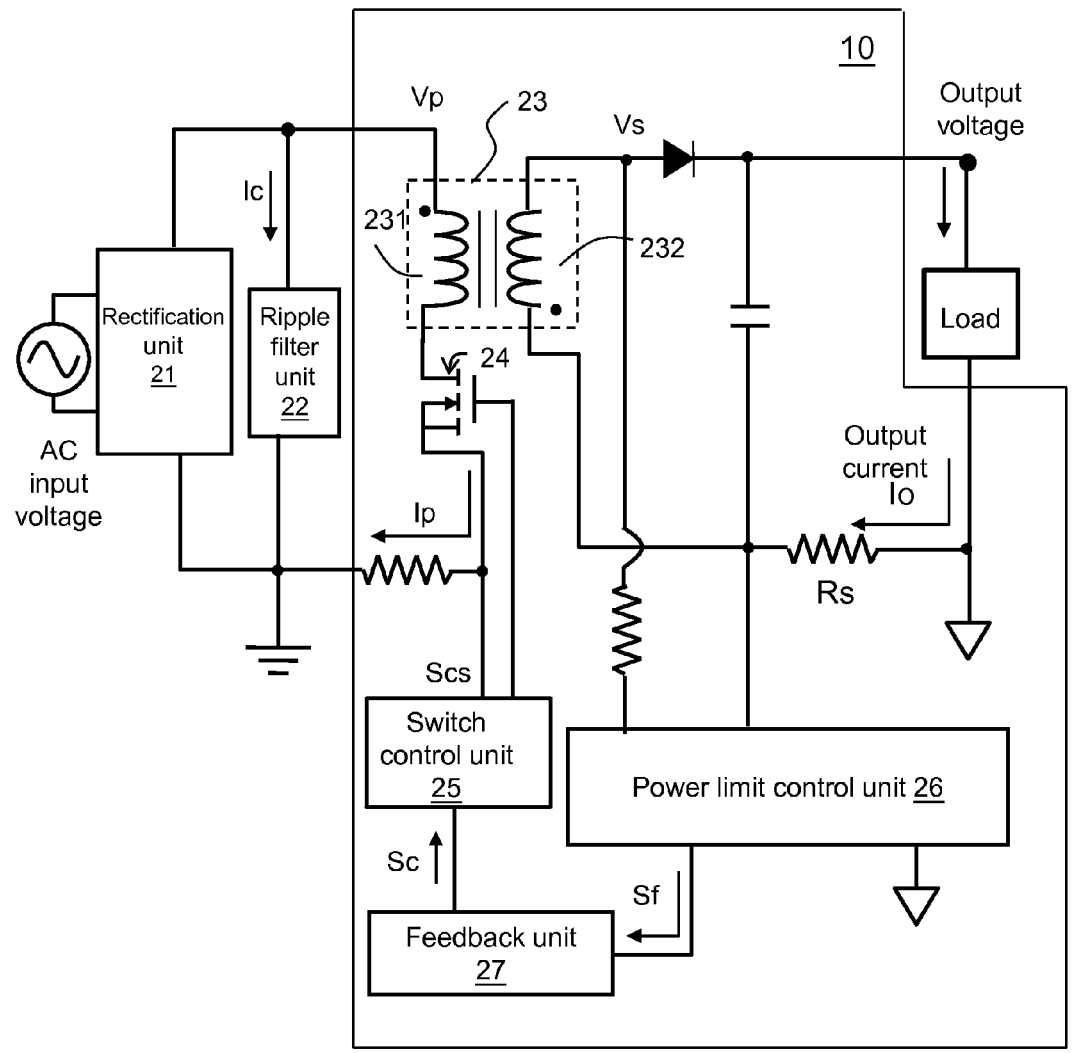
FIG. 2 shows a power converter circuit according to one embodiment of the present invention.

FIG. 2 shows a power converter circuit 10 according to one embodiment of the present invention. An AC input voltage is rectified by a rectification unit 21 to generate a rectified voltage. The rectification unit 21 is, for example but not limited to, a bridge rectifier as shown in FIG. 3. A ripple filter unit 22 is connected to the output of the rectification circuit, for filtering the rectified voltage to generate a filtered voltage, which is received by the power converter circuit 10. The ripple filter unit 22 for example includes a capacitor Cin as shown in FIG. 4.

The power converter circuit 10 includes a transformer 23, a switch 24, a switch control unit 25, a power limit control unit 26, and a feedback unit 27. The transformer 23 includes a primary winding 231 at a primary side of the transformer 23, and a secondary winding 232 at a secondary side of the transformer 23. The primary winding 231 is configured to receive the filtered voltage as the primary side voltage Vp. The secondary winding 232 is configured to generate a secondary side voltage Vs and an output current Io at the secondary side of the transformer 23. An output voltage is generated by the secondary side voltage Vs. The output voltage and the output current Io are supplied to a load. The switch 24 is connected in series to the primary winding 231 to determine a primary side current Ip flowing through the primary winding 231. The switch 24 is controlled by the switch control unit 25. The switch control unit 25 is located at the primary side of the transformer 23; the switch control unit 25 controls the switch 24 to determine the primary side current Ip. In one embodiment, the switch control unit 25 controls the switch 24 according to a feedback signal Sc from the feedback unit 27 and a current sense signal Scs which is obtained by sensing the primary side current Ip. The power limit control unit 26 is located at the secondary side of the transformer and coupled to the secondary winding 232, for deciding a target of the output current Io according to the primary side voltage Vp. The power limit control unit 26 senses the secondary side voltage Vs to obtain information of the primary side voltage Vp, and sets the target of the output current Io according to the information of the primary side voltage Vp such that when the primary side voltage Vp drops to a threshold, the output current Io is reduced. The feedback unit 27 is coupled between the power limit control unit 26 and the switch control unit 25, for providing the feedback signal Sc from the power limit control unit 26 to the switch control unit 25. The feedback unit 27 is, for example but not limited to, an opto-coupler as shown in FIG. 5, which receives a signal Sf from the power limit control unit 26 and generates the feedback signal Sc.

Figure 6:
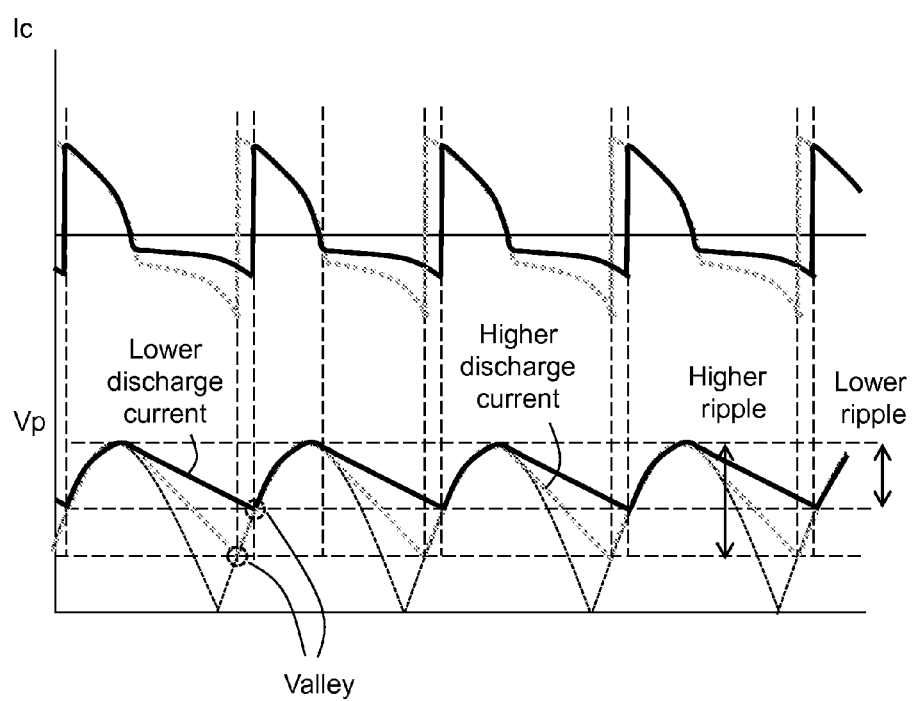
FIG. 6 shows a relationship between a current of the ripple filter unit and a primary side voltage.

FIG. 6 shows a relationship between a primary side voltage Vp and a current Ic flowing into or out from the ripple filter unit 22. When the ripple filter unit 22 is of a lower quality, for example when the capacitor therein is aged, or when a capacitor of a lower capacitance is used, the current Ic is discharged from the ripple filter unit 22 by a higher speed, whereby the valley of the primary side voltage Vp is relatively lower. In contrast, when the current Ic is discharged from the ripple filter unit 22 by a lower speed, the valley of the primary side voltage Vp is relatively higher. To counter this problem, the present invention proposes to control the output current Io by the power limit control unit 26. According to one embodiment of the present invention, the power limit control unit 26 reduces a target of the output current Io, when the primary side voltage Vp has a relatively higher ripple. Thus, because the output current Io is reduced, the capacitor in the ripple filter unit 22 discharges slower, and the valley of the primary side voltage Vp will become higher to reduce the ripple.

Figure 7:
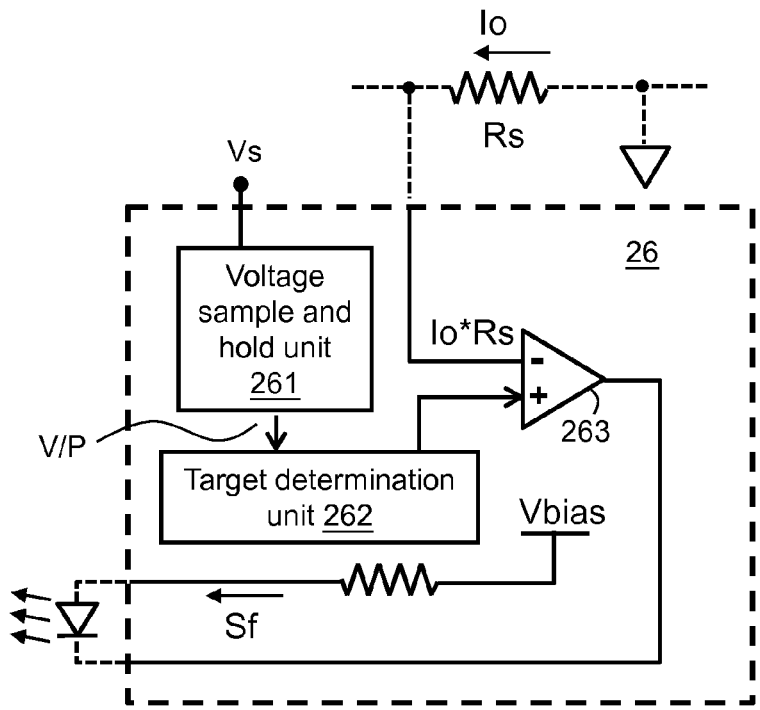
FIG. 7 shows a power limit control unit according to one embodiment of the present invention.

FIG. 7 shows a power limit control unit 26 according to one embodiment of the present invention. The power limit control unit 26 includes: a voltage sample and hold unit 261, a target determination unit 262, and a comparison unit 263. The voltage sample and hold unit 261 senses the secondary side voltage Vs to obtain information of the primary side voltage Vp. The information of the primary side voltage Vp for example can be a waveform feature V/P of the primary side voltage Vp, such as a valley or a peak of the primary side voltage Vp. The target determination unit 262 determines the target of the output current Io according to the waveform feature V/P of the primary side voltage Vp. The comparison unit 263 compares the output current Io and the target of the output current Io, to generate a signal Sf for the feedback unit 27 to transmit corresponding information to the switch control unit 25 at the primary side of the transformer 23.

Figure 8:
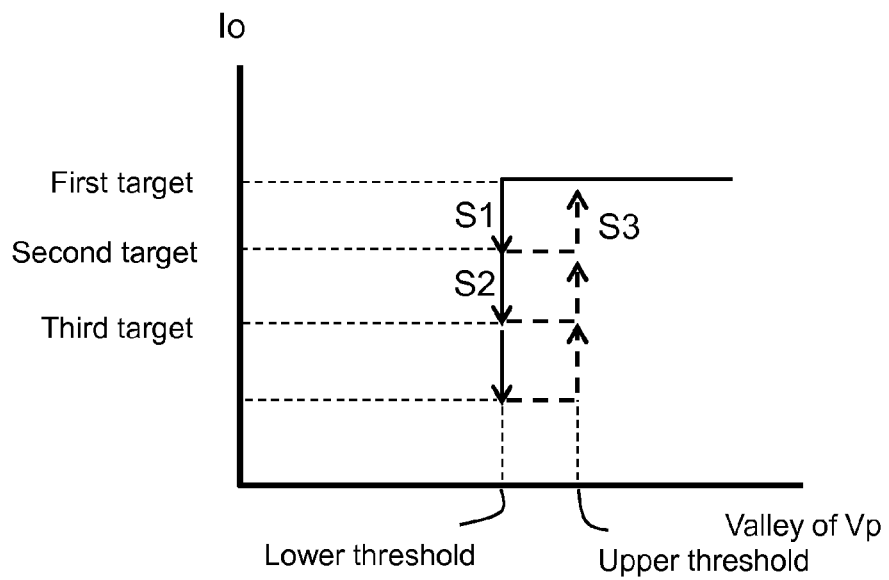
FIG. 8 shows a relationship between the targets of the output current and the threshold settings of the valleys of the primary side voltage according to one embodiment of the present invention.
Figure 9:
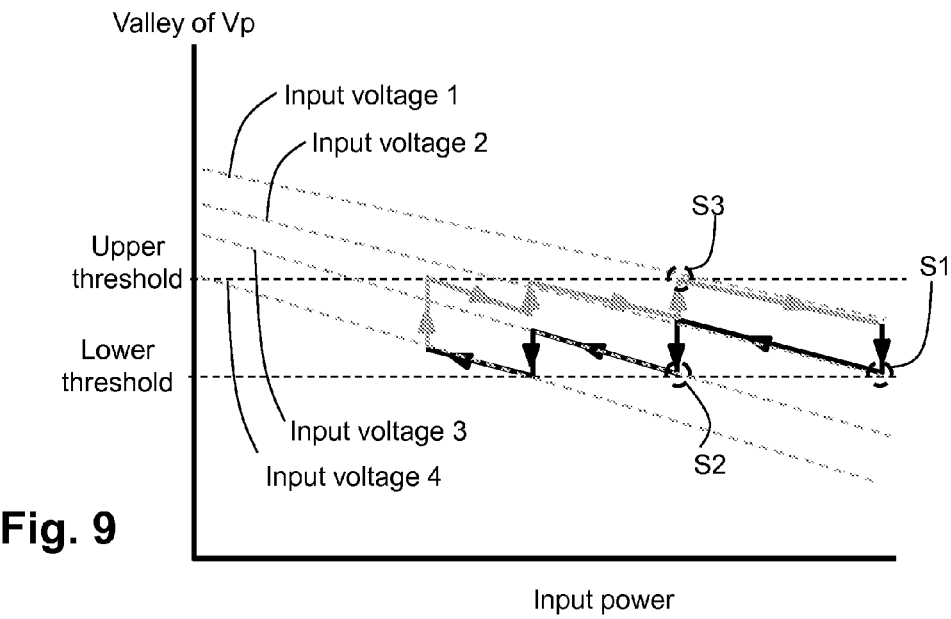
FIG. 9 shows a relationship between the valley of the primary side voltage and the input power according to one embodiment of the present invention.

FIG. 8 shows an example as to how the targets of the output current Io can be set according to the valley of the primary side voltage Vp, according to one embodiment of the present invention. As shown in FIG. 8, the first target, the second target, and the third target are different targets for the output current Io, wherein the third target is lower than the second target, and the second target is lower than the first target. FIG. 9 shows a relationship between the valley of the primary side voltage Vp and the input power, which is an illustrative example to explain how the present invention adjusts the output current Io to reduce ripple. Please refer to FIGS. 7-9. Assuming that the power converter circuit 10 is originally operating to provide an output current Io, which is a normal operation current that corresponds to the first target. However, due to some reason such as the aging of the capacitor in the ripple filter unit 22, or because the AC input voltage is unstable and drops lower (the latter being shown in FIG. 9 as an illustrative example), the valley of the primary side voltage Vp drops to a threshold, which is the lower threshold in FIG. 8. The voltage sample and hold unit 261 senses the primary side voltage Vp and obtains the waveform feature V/P of the primary side voltage Vp, in this embodiment the valley of the primary side voltage Vp. In response to the fact that the valley of the primary side voltage Vp drops to the lower threshold, the target determination unit 262 sets the target of the output current Io to the second target which is lower than the first target (S1 in FIGS. 8 and 9).

Because the target of the output current Io is reduced, by feedback control, the output current Io will be reduced to a lower current corresponding to the second target. And, because the output current Io is reduced, the valley of the primary side voltage Vp will become higher as explained in the above.

However, if the situation is even worse, and the valley of the primary side voltage Vp does not become higher. Then, the target determination unit 262 can set the target of the output current Io to the third target which is lower than the second target (S2 in FIGS. 8 and 9). Or, on the contrary, if the AC input voltage becomes stable and the valley of the primary side voltage Vp reaches the higher threshold, the target determination unit 262 can set the target of the output current Io back to the first target (S3 in FIGS. 8 and 9). Note that, to provide a hysteresis band between the upper threshold and the lower threshold is a preferred embodiment to avoid mis-operation caused by noises; however, this is only preferred but not necessary. The upper threshold and the lower threshold can be just one threshold.

In the above embodiment, the lower threshold of the valley of the primary side voltage Vp is set the same in correspondence to the different targets. This is only preferred but not necessary. In another embodiment, the lower threshold corresponding to the target-switching action S2 can be different from the lower threshold corresponding to the target-switching action S1, lower or higher.

Figure 10:
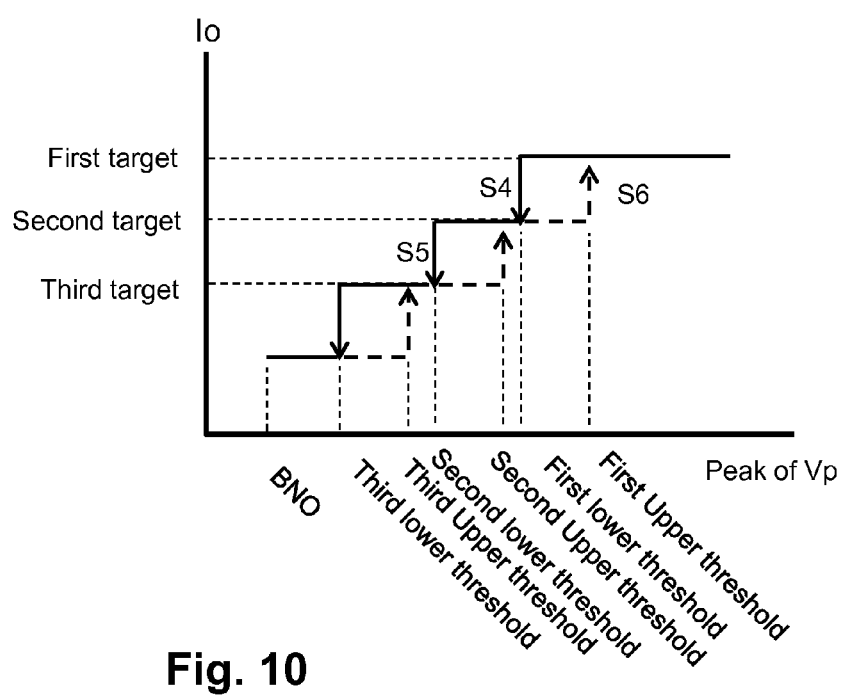
FIG. 10 shows a relationship between the output current and the peak of the primary side voltage according to one embodiment of the present invention.

In another embodiment, the waveform feature V/P of the primary side voltage Vp can be the peak of the primary side voltage Vp, and the adjustment of the output current Io can be determined according to the peak of the primary side voltage Vp. FIG. 10 shows a relationship between the output current Io and the peak of the primary side voltage Vp according to one embodiment of the present invention. According to the embodiment of FIG. 10, assuming that the power converter circuit 10 is originally operating to provide an output current Io, which is a normal operation current that corresponds to the first target, but a certain reason causes the peak of the primary side voltage Vp to drop lower to the first lower threshold. In response to this, the power limit control unit sets target of the output current Io to the second target which is lower than the first target (S4), such that the output current Io is correspondingly reduced. Similarly, if the peak of the primary side voltage Vp keeps dropping to the second lower threshold, the power limit control unit sets the target of the output current Io to the third target which is lower than the second target (S5). However, if the peak of the primary side voltage Vp rises to the first upper threshold, the power limit control unit sets the target of the output current Io back to the first target (S6). In one embodiment, if the primary side voltage Vp keeps dropping, the power converter circuit 10 may enter a brownout (BNO) mode and is shutdown.

Figure 11:
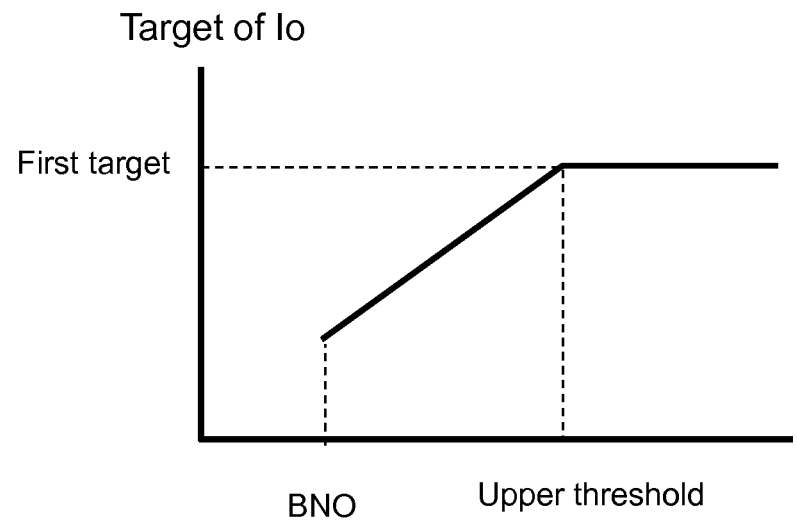
FIG. 11 shows a relationship between the target of the output current and the peak of the primary side voltage according to one embodiment of the present invention.

FIG. 11 shows another embodiment, wherein the target of the output current Io can be adjusted in a continuous way to follow the change of the primary side voltage Vp (the change in the valley, peak or average of the primary side voltage Vp).

Figure 12:
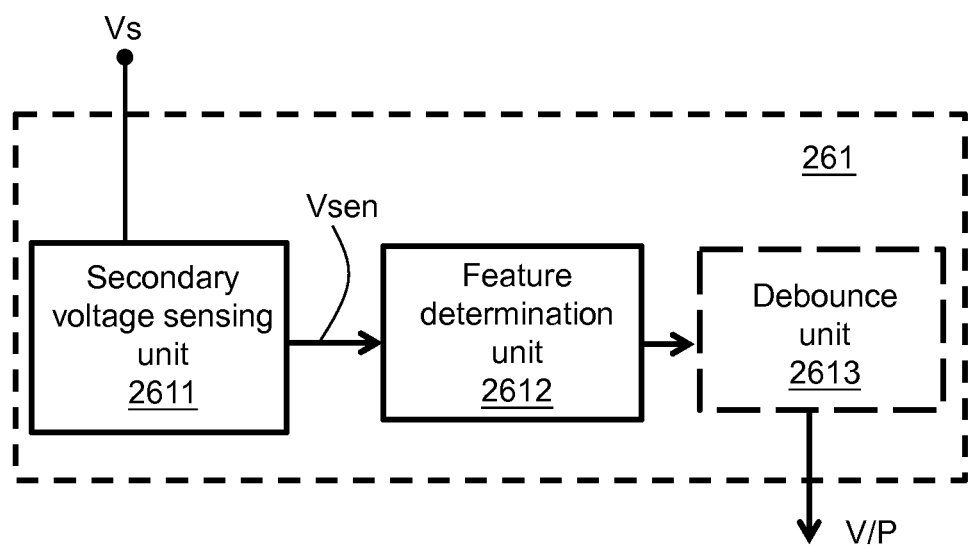
FIG. 12 shows a voltage sample and hold unit according to one embodiment of the present invention.

FIG. 12 shows a voltage sample and hold unit 261 according to one embodiment of the present invention, which includes a secondary voltage sensing unit 2611 and a feature determination unit 2612. Preferred but not necessary, the voltage sample and hold unit 261 may further include a debounce unit 2613, for filtering a noise in the output of the feature determination unit 2612. The secondary voltage sensing unit 2611 senses the secondary side voltage to obtain sensed voltages at different timings. The feature determination unit 2612 determines a highest or a lowest sensed voltage among the sensed voltages in a predetermined period, as the waveform feature V/P of the primary side voltage Vp.

Figure 13:
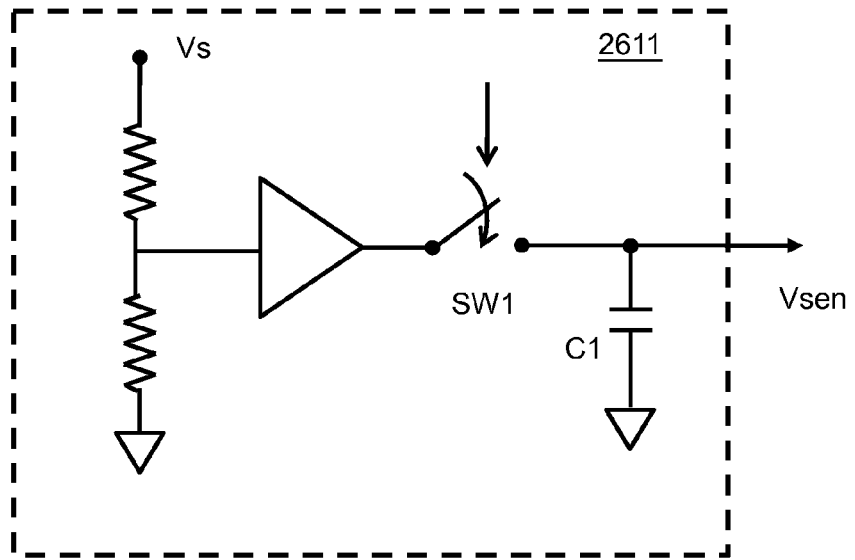
FIG. 13 shows a secondary side voltage sensing unit according to one embodiment of the present invention.

FIG. 13 shows a secondary side voltage sensing unit 2611 according to one embodiment of the present invention. The secondary side voltage sensing unit 2611 senses the secondary side voltage Vs by a predetermined frequency and stores the sensed voltage in a capacitor C1, which is the sense voltage Vsen.

Figure 14:
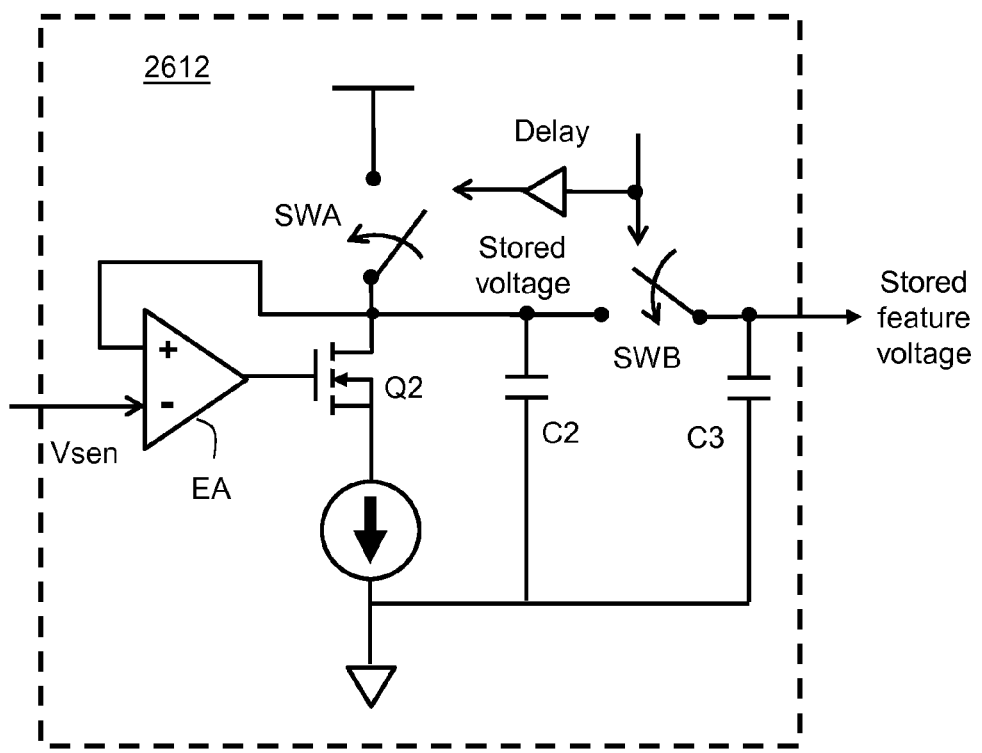
FIG. 14 shows a feature determination unit according to one embodiment of the present invention.

FIG. 14 shows a feature determination unit 2612 according to one embodiment of the present invention. The feature determination unit 2612 includes an error amplifier EA having one input receiving the sense voltage Vsen and an output controlling a transistor Q2. The other input of the error amplifier EA is connected to a capacitor C2 and an upper end of the transistor Q2. The lower end of the transistor Q2 is connected to a current source. When the voltage across the capacitor C2 is higher than the sense voltage Vsen, the transistor Q2 is conductive, and the capacitor C2 discharges. When the voltage across the capacitor C2 is lower than the sense voltage Vsen, the transistor Q2 is OFF, and the capacitor C2 does not discharge. As such, the valley of the sense voltage Vsen can be stored in the capacitor C2. By properly controlling the switch SWB at suitable timings, the information stored in the capacitor C2, which is the stored feature voltage, can be transferred to the capacitor C3 and outputted. The switch SWA can be controlled at suitable timings to recharge the capacitor C2.

The feature determination unit 2612 in the above embodiment is a valley detector; it can be modified to become a peak detector. The inputs of the error amplifier EA and the location of the current source can be modified such that, when the voltage across the capacitor C2 is lower than the sense voltage Vsen, the transistor Q2 is conductive, and the capacitor C2 is charged. When the voltage across the capacitor C2 is higher than the sense voltage Vsen, the transistor Q2 is OFF, and the capacitor C2 is not charged. The switch SWA can be controlled at suitable timings to discharge the capacitor C2. As such, the peak of the sense voltage Vsen can be stored in the capacitor C2.

Figure 15:
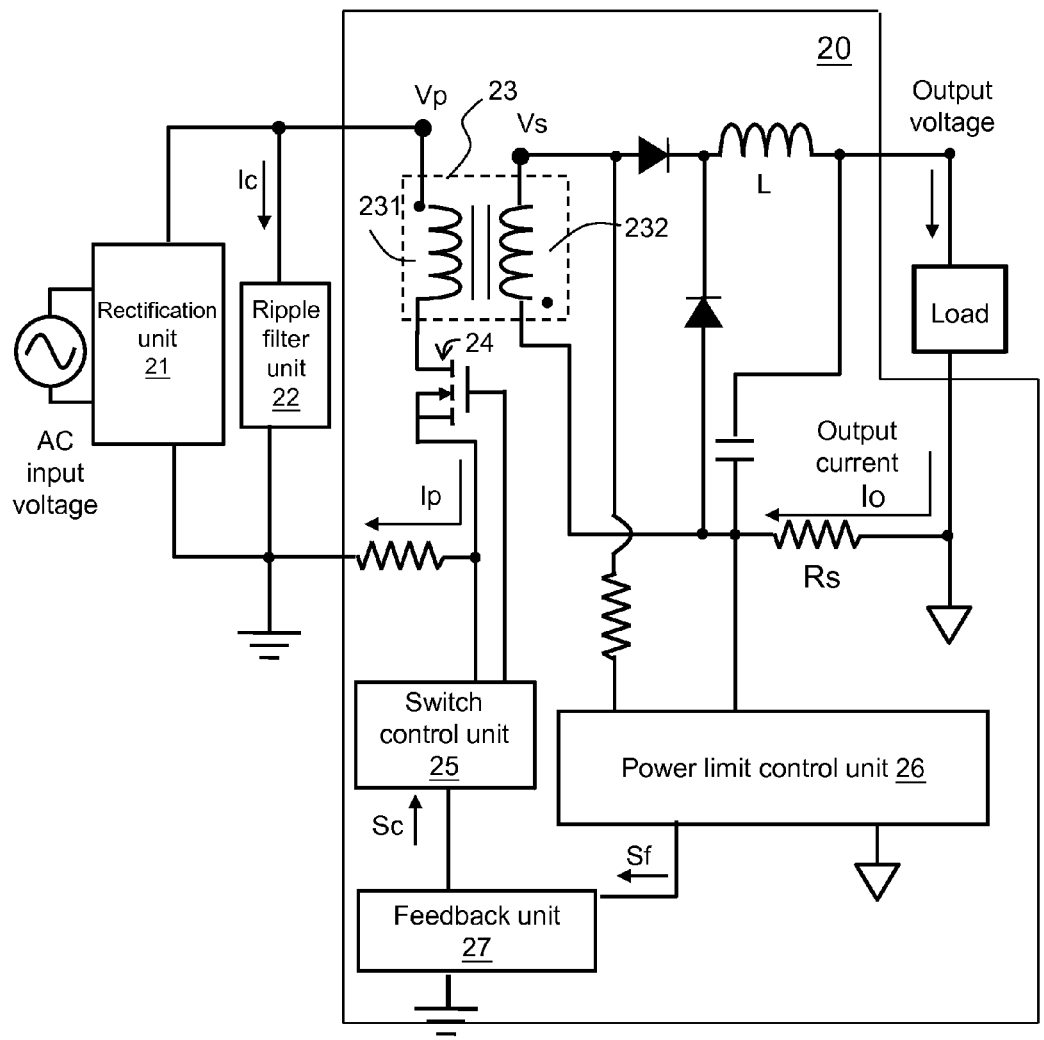
FIG. 15 shows a power converter circuit according to another embodiment of the present invention.

The present invention is applicable not only to the topology shown in FIG. 2. For example, in one embodiment, the power converter circuit 20 according to the present invention can be applied to the topology as shown in FIG. 15, wherein the power converter circuit 20 further includes an inductor L, which is coupled between the secondary winding 232 and the output voltage.

The present invention has been described in considerable detail with reference to certain preferred embodiments thereof. It should be understood that the description is for illustrative purpose, not for limiting the scope of the present invention. Those skilled in this art can readily conceive variations and modifications within the spirit of the present invention. For example, there may be additional devices or circuits inserted between two devices or circuits shown to be in direct connection in the embodiments, as long as such inserted devices or circuits (such as a switch, a diode, a resistor, a filter, etc.) do not affect the primary function of the circuitry. Besides, an embodiment or a claim of the present invention does not need to attain or include all the objectives, advantages or features described in the above. The abstract and the title are provided for assisting searches and not to be read as limitations to the scope of the present invention.

What is claimed is:

1. A power converter circuit, comprising:
   a transformer, including a primary winding configured to receive a primary side voltage at a primary side of the transformer and a secondary winding configured to generate a secondary side voltage and an output current at a secondary side of the transformer, wherein the primary side voltage has a waveform that includes at least a part of a semi-sinusoidal waveform;
   a switch, coupled to the primary winding to determine a primary side current flowing through the primary winding;
   a switch control unit at the primary side of the transformer, configured to operably control the switch to determine the primary side current;
   a power limit control unit at the secondary side of the transformer, configured to operably decide a target of the output current according to the primary side voltage, wherein the power limit control unit senses the secondary side voltage to obtain information of the primary side voltage, and sets the target of the output current according to the information of the primary side voltage such that when the primary side voltage drops to a first threshold, the output current is reduced to a constant, such that by setting the output current to the constant, the primary side voltage is controlled between the first threshold and an upper threshold of a higher voltage level than the first threshold; and
   a feedback unit, coupled between the power limit control unit and the switch control unit, and configured to operably provide a feedback signal from the power limit control unit to the switch control unit.

2. The power converter circuit of claim 1, wherein the primary side voltage is generated by: rectifying an AC input voltage by a rectification unit and filtering an output of the rectification unit by a ripple filter unit, wherein the ripple filter unit includes a capacitor.

3. The power converter circuit of claim 1, wherein the power limit control unit includes:
   a voltage sample and hold unit, configured to operably sense the secondary side voltage to obtain a waveform feature of the primary side voltage;
   a target determination unit, configured to operably determine the target of the output current according to the waveform feature of the primary side voltage; and
   a comparison unit, configured to operably compare the output current and the target of the output current, to generate the feedback signal.

4. The power converter circuit of claim 3, wherein the waveform feature is a valley of the primary side voltage or a peak of the primary side voltage.

5. The power converter circuit of claim 3, wherein the voltage sample and hold unit includes:
   a secondary voltage sensing unit, configured to operably sense the secondary side voltage to obtain sensed voltages at different timings; and
   a feature determination unit, configured to operably determine a highest or a lowest sensed voltage among the sensed voltages in a predetermined period, as the waveform feature of the primary side voltage.

6. The power converter circuit of claim 5, wherein the voltage sample and hold unit further includes a debounce unit coupled to an output of the feature determination unit, and configured to operably filter a noise in the output of the feature determination unit.

7. The power converter circuit of claim 1, wherein the feedback unit is an opto-coupler circuit.

8. The power converter circuit of claim 1, wherein when a valley of the primary side voltage is above the first threshold, the power limit control unit sets the target of the output current to a normal operation target, and when the valley of the primary side voltage drops to the first threshold, the power limit control unit sets the target of the output current to the constant which is a first reduced target lower than the normal operation target, and when the valley of the primary side voltage drops to a second threshold, the power limit control unit sets the target of the output current to a second reduced target which is another constant and is lower than the first reduced target.

9. The power converter circuit of claim 8, wherein the second threshold is equal to the first threshold.

10. The power converter circuit of claim 1, wherein when a peak of the primary side voltage is above the first threshold, the power limit control unit sets the target of the output current to a normal operation target, and when the peak of the primary side voltage drops to the first threshold, the power limit control unit sets the target of the output current to the constant which is a first reduced target lower than the normal operation target, and when the peak of the primary side voltage drops to a second threshold, the power limit control unit sets the target of the output current to a second reduced target which is another constant and is lower than the first reduced target.

11. The power converter circuit of claim 1, further comprising an inductor, coupled between the secondary winding and an output terminal connected to a load.

12. A power limit control circuit for use in a power converter circuit, wherein the power converter circuit includes a transformer, the transformer including a primary winding configured to receive a primary side voltage at a primary side of the transformer and a secondary winding configured to generate a secondary side voltage and an output current at a secondary side of the transformer, wherein the primary side voltage has a waveform that includes at least a part of a semi-sinusoidal waveform, the power limit control circuit being configured to be located at the secondary side of the transformer and configured to be coupled to the secondary winding, the power limit control circuit comprising:
 a voltage sample and hold circuit, configured to operably sense the secondary side voltage to obtain a waveform feature of the primary side voltage;
 a target determination circuit, configured to operably determine a target of the output current according to the waveform feature of the primary side voltage; and
 a comparison circuit, configured to operably compare the output current and the target of the output current, to generate a feedback signal which is sent to the primary side of the transformer,
 wherein the power limit control circuit sets the target of the output current such that when the primary side voltage drops to a first threshold, the output current is reduced to a constant, such that by setting the output current to the constant, the primary side voltage is controlled between the first threshold and an upper threshold of a higher voltage level than the first threshold.

13. The power limit control circuit of claim 12, wherein the waveform feature is a valley of the primary side voltage or a peak of the primary side voltage.

14. The power limit control circuit of claim 12, wherein the voltage sample and hold circuit includes:
 a secondary voltage sensing circuit, configured to operably sense the secondary side voltage to obtain sensed voltages at different timings; and
 a feature determination circuit, configured to operably determine a highest or a lowest sensed voltage among the sensed voltages in a predetermined period, as the waveform feature of the primary side voltage.

15. The power limit control circuit of claim 14, wherein the voltage sample and hold circuit further includes a debounce circuit coupled to an output of the feature determination circuit, and configured to operably filter a noise in the output of the feature determination circuit.

16. The power limit control circuit of claim 12, wherein when a valley of the primary side voltage is above the first threshold, the power limit control unit sets the target of the output current to a normal operation target, and when the valley of the primary side voltage drops to the first threshold, the power limit control unit sets the target of the output current to the constant which is a first reduced target lower than the normal operation target, and when the valley of the primary side voltage drops to a second threshold, the power limit control unit sets the target of the output current to a second reduced target which is another constant and is lower than the first reduced target.

17. The power limit control circuit of claim 16, wherein the second threshold is equal to the first threshold.

18. The power converter circuit of claim 12, wherein when a peak of the primary side voltage is above the first threshold, the power limit control unit sets the target of the output current to a normal operation target, and when the peak of the primary side voltage drops to the first threshold, the power limit control unit sets the target of the output current to the constant which is a first reduced target lower than the normal operation target, and when the peak of the primary side voltage drops to a second threshold, the power limit control unit sets the target of the output current to a second reduced target which is another constant and is lower than the first reduced target.

* * * * *